US009566826B2

(12) United States Patent
Yaschur

(10) Patent No.: US 9,566,826 B2
(45) Date of Patent: Feb. 14, 2017

(54) CORDLESS WHEEL LIFTS

(71) Applicant: Ingersoll-Rand Company, Davidson, NC (US)

(72) Inventor: Jefferey Clifford Yaschur, Doylestown, PA (US)

(73) Assignee: Ingersoll-Rand Company, Davidson, NC (US)

( * ) Notice: Subject to any disclaimer, the term of this patent is extended or adjusted under 35 U.S.C. 154(b) by 32 days.

(21) Appl. No.: 14/634,459

(22) Filed: Feb. 27, 2015

(65) Prior Publication Data

US 2016/0251205 A1    Sep. 1, 2016

(51) Int. Cl.
| | | |
|---|---|---|
| *B60B 30/02* | (2006.01) | |
| *B66F 7/24* | (2006.01) | |
| *B60B 30/10* | (2006.01) | |

(52) U.S. Cl.
CPC .............. *B60B 30/02* (2013.01); *B60B 30/10* (2013.01); *B66F 7/246* (2013.01)

(58) Field of Classification Search
CPC .......... B60B 29/00; B60B 29/006; B66F 5/00; B66F 5/02; B66F 5/025
See application file for complete search history.

(56) References Cited

U.S. PATENT DOCUMENTS

| | | | | |
|---|---|---|---|---|
| 1,169,255 A | * | 1/1916 | Graham | B62B 3/02 |
| | | | | 254/7 B |
| 1,361,889 A | * | 12/1920 | Miller | B60B 29/002 |
| | | | | 105/157.1 |
| 1,650,031 A | * | 11/1927 | Nash | B60S 13/00 |
| | | | | 105/215.1 |
| 2,231,192 A | * | 2/1941 | Olsen | B60B 29/002 |
| | | | | 414/428 |
| 2,252,534 A | * | 8/1941 | Trotter | B60B 29/002 |
| | | | | 105/215.1 |

(Continued)

FOREIGN PATENT DOCUMENTS

| | | |
|---|---|---|
| GB | 2187435 A | 9/1987 |
| GB | 2274269 A | 7/1994 |

(Continued)

OTHER PUBLICATIONS

Purdue University, "Compac 90538 Wheel Dolly," Sep. 13, 2012, 3 pages.

(Continued)

*Primary Examiner* — Joseph J Hail
*Assistant Examiner* — Tyrone V Hall, Jr.
(74) *Attorney, Agent, or Firm* — Barnes & Thornburg LLP

(57) ABSTRACT

In at least one illustrative embodiment, a lift may comprise a support frame, a pair of lift arms pivotally coupled to the support frame and configured to support a motor vehicle tire, and a powertrain including a motor and a pair of pull rods, each of the pull rods being coupled between the motor and one of the pair of lift arms. The powertrain is operable to move the pair of lift arms between a first position, in which the second end of each of the lift arms is positioned a first distance above the support frame, and a second position, in which the second end of each of the lift arms is positioned a second distance above the support frame, the second distance being greater than the first distance.

20 Claims, 4 Drawing Sheets

(56) References Cited

U.S. PATENT DOCUMENTS

| | | | |
|---|---|---|---|
| 2,326,684 A * | 8/1943 | Ross | B60S 13/00 254/2 R |
| 2,386,516 A * | 10/1945 | Thompson | B60B 29/002 108/55.3 |
| 2,392,830 A * | 1/1946 | Baum | B60B 29/002 104/32.1 |
| 2,476,493 A * | 7/1949 | Johnson | B60B 29/002 254/2 R |
| 2,484,534 A * | 10/1949 | Smith | B60B 29/002 254/127 |
| 2,490,233 A | 12/1949 | Schildmeier | |
| 2,554,365 A * | 5/1951 | Johnston, Jr. | B66F 3/12 254/8 R |
| 4,460,306 A * | 7/1984 | Hawkins | B60B 29/002 280/43.2 |
| 4,872,694 A | 10/1989 | Griesinger | |
| 4,900,215 A * | 2/1990 | Nowell | B60B 29/002 254/8 R |
| D319,131 S | 8/1991 | Smeitink | |
| 5,096,161 A * | 3/1992 | Tomasevic | B66F 5/025 254/7 B |
| D344,835 S | 3/1994 | MacEachern | |
| 5,496,014 A * | 3/1996 | Hsu | B66F 3/12 254/103 |
| 5,694,864 A | 12/1997 | Langewellpott | |
| 5,893,571 A * | 4/1999 | Nowell | B60B 29/002 280/402 |
| 5,992,826 A * | 11/1999 | Simmonds | B66F 3/16 254/103 |
| D468,512 S | 1/2003 | Hernandez | |
| D488,905 S | 4/2004 | DiStaulo | |
| 6,863,488 B2 | 3/2005 | Chopra | |
| 6,910,677 B1 * | 6/2005 | Miller | B66F 3/12 254/103 |
| D532,575 S | 11/2006 | Oberg | |
| 7,137,615 B2 | 11/2006 | Ray et al. | |
| 7,334,804 B2 * | 2/2008 | Mitchell | B60B 29/001 280/79.11 |
| D589,224 S | 3/2009 | Kilpatrick | |
| D596,823 S | 7/2009 | Thurm | |
| D640,440 S | 6/2011 | Thurm | |
| 7,980,804 B2 | 7/2011 | Snook et al. | |
| D703,906 S | 4/2014 | Gann et al. | |
| D712,111 S | 8/2014 | Chernyshou | |
| 2006/0181057 A1 * | 8/2006 | Kollarits | B60B 29/002 280/475 |
| 2010/0092270 A1 | 4/2010 | Adams | |
| 2010/0207085 A1 | 8/2010 | Thurm | |
| 2013/0134685 A1 | 5/2013 | John | |
| 2013/0276306 A1 | 10/2013 | Calvi | |

FOREIGN PATENT DOCUMENTS

| | | |
|---|---|---|
| WO | 2009056168 A1 | 5/2009 |
| WO | 2011132168 A1 | 10/2011 |

OTHER PUBLICATIONS

Northern Tool + Equipmewnt, "Torin Wheel Dolly—Heavy-Duty, 2400-Lb. Capacity, Model # TX12001," available at http://www.northerntool.com/shop/tools/product_200381630_200381630, 1 page.

Northern Tool + Equipmwent, "TSI Clever Lever® Tire Caddie— For 36-48in Dia. Tires, Model # HD26," available at http://www.northerntool.com/shop/tools/product_200327731_200327731, 1 page.

TSISSG, "TW2000 Tweel Handlert," 2013, 1 page.

T & L Industries Co., "Red Viper Heavy Duty Jack Dolly," available at http://red-viper.com/products/, 2013, 4 pages.

TSISSG, "Tire Carts & Dollies," 2013, 1 page.

* cited by examiner

CORDLESS WHEEL LIFTS

TECHNICAL FIELD

The present disclosure relates, generally, to lifts for motor vehicle tires and, more particularly, to cordlessly-powered lifts for motor vehicle tires.

BACKGROUND

Existing approaches for changing motor vehicles tires typically require a user to perform a number of manual operations. For instance, existing approaches may require the user to manually remove the tire to be changed, manually raise a replacement tire toward a hub configured to support the replacement tire (once the tire to be changed has been removed), and/or manually align the replacement tire relative to the hub once the replacement tire has been raised. The manual labor associated with such approaches tends to limit their desirability.

SUMMARY

According to one aspect, a lift may comprise a support frame, a pair of lift arms, and a power train. Each of the lift arms may include a first end pivotally coupled to the support frame and a second end opposite the first end. The second ends of the pair of lift arms may be configured to engage a motor vehicle tire such that the pair of lift arms cooperatively support the tire. The powertrain may include a motor and a pair of pull rods. Each of the pull rods may be coupled between the motor and one of the pair of lift arms. The motor may be movable relative to the support frame in a vertical direction and restrained from movement relative to the support frame in horizontal directions. The powertrain may be operable to move the pair of lift arms between a first position, in which the second end of each of the lift arms is positioned a first distance above the support frame, and a second position, in which the second end of each of the lift arms is positioned a second distance above the support frame, the second distance being greater than the first distance.

In some embodiments, the powertrain may further comprise a pair of output shafts. Each of the pair of output shafts may be coupled between the motor and one of the pair of pull rods. The motor may include a rotor shaft, and the powertrain may further include a gear reduction mechanism coupled between the rotor shaft and the pair of output shafts. The gear reduction mechanism may be configured to prevent undesired movement of the pair of lift arms when the motor vehicle tire is supported on the pair of lift arms.

In some embodiments, each of the pair of pull rods may include external threads, and each of the pair of output shafts may include internal threads that engage the external threads of one of the pair of pull rods. The pair of output shafts may be configured to transmit rotational power from the motor to the pair of pull rods to cause the pair of pull rods to move inwardly and outwardly relative to the pair of output shafts to move the pair of lift arms between the first and second positions.

In some embodiments, the lift may further comprise a housing supported by the support frame. The motor may be positioned within the housing. A first portion of each of the pull rods may be covered by the housing, and a second portion of each of the pull rods may extend outside of the housing between the housing and one of the pair of lift arms. The housing may be formed to include a cutout sized to receive a power source, where the power source is configured to supply power to the motor when the power source is received in the cutout. The power source may comprise a cordless power tool battery. The housing may be formed to include a pair of storage trays, and the cutout sized to receive the power source may be positioned between the pair of storage trays.

In some embodiments, the lift may further comprise a switch coupled to the housing, the switch being configured to control operation of the motor. The switch may comprise a pedal positioned beneath the housing.

According to another aspect, a lift may comprise a support frame including a pedestal, a pair of lift arms, and a power train. Each of the lift arms may include a first end pivotally coupled to the support frame and a second end opposite the first end. The second ends of the pair of lift arms may be configured to engage a motor vehicle tire such that the pair of lift arms cooperatively support the tire. The powertrain may be supported on the pedestal and may be operable to move the pair of lift arms between a first position, in which the second end of each of the lift arms is positioned a first distance above the support frame, and a second position, in which the second end of each of the lift arms is positioned a second distance above the support frame, the second distance being greater than the first distance. The powertrain may be configured to move relative to the pedestal in a vertical direction when the pair of lift arms moves between the first and second positions.

In some embodiments, the pedestal may extend in the vertical direction to define an axis and may be shaped to constrain the powertrain against rotation about the axis. The powertrain may be restrained from movement relative to the pedestal in a first horizontal direction when the pair of lift arms move between the first and second positions. The powertrain may comprise a pair of pull rods each coupled to one of the pair of lift arms such that movement of the pair of pull rods relative to the housing along a second horizontal direction causes the pair of lift arms to move between the first and second positions, where the second horizontal direction is perpendicular to the first horizontal direction.

In some embodiments, the lift may further comprise a housing supported on the support frame. The housing may include a central body and a pair of housing arms coupled to the central body and extending outwardly therefrom in opposite directions. The central body may define an interior space. Each of the housing arms may be formed to include a bore extending therethrough to open into the interior space. The powertrain may comprise a pair of pull rods each coupled to one of the pair of lift arms and extending through one of the bores formed in the housing arms. Each housing arm may be formed to include a channel that defines a storage tray, and the central body may be formed to include a cutout sized to receive a cordless power tool battery.

In some embodiments, the lift may further comprise a switch coupled to the central body, where the switch is configured to control operation of the powertrain. The switch may comprise a pedal positioned beneath the central body.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

Figure 1:
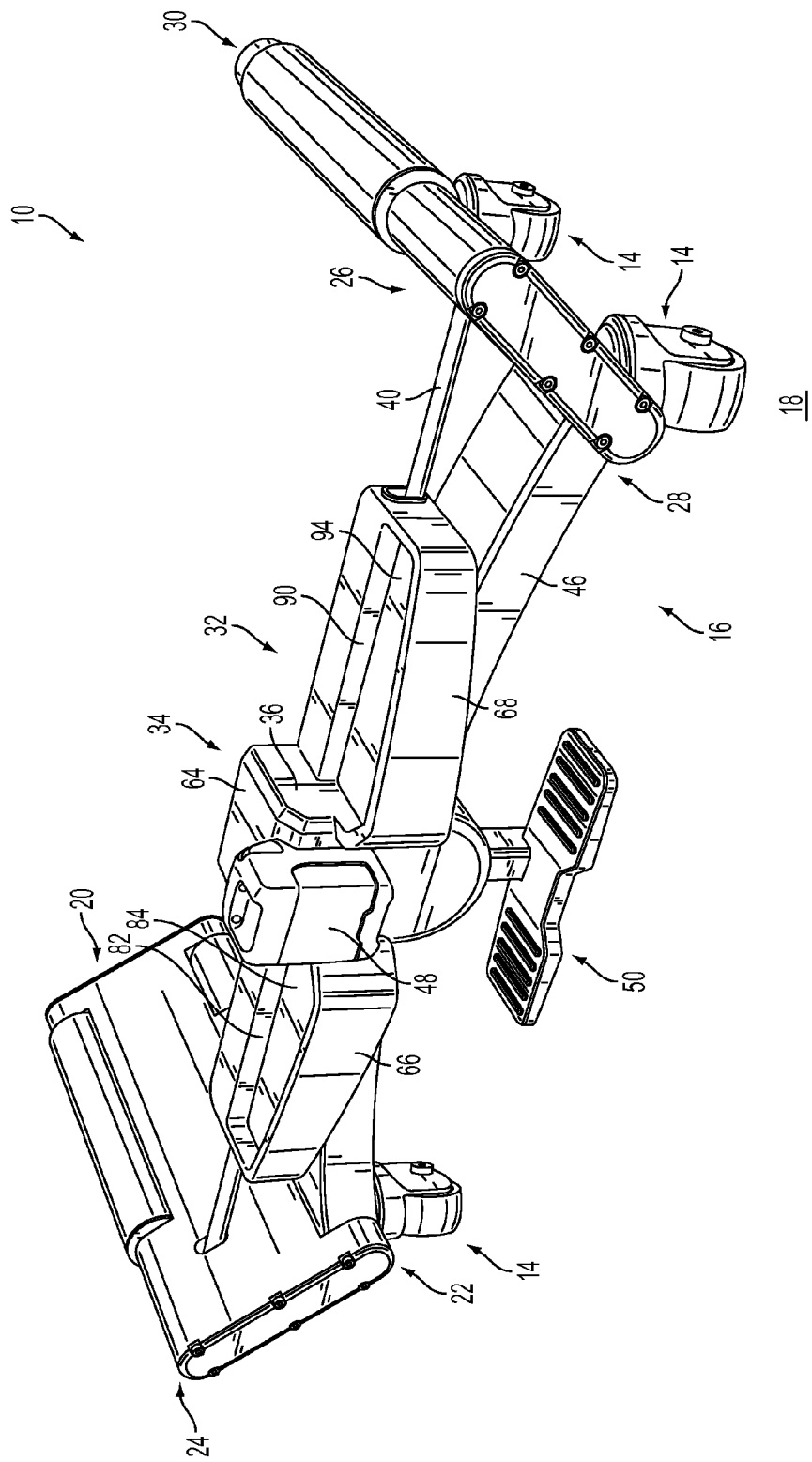
FIG. 1 is a perspective view of one illustrative embodiment of a cordless wheel lift.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Referring now to FIG. 1, one illustrative embodiment of a cordless wheel lift 10 is shown. The lift 10 is configured for use in changing a motor vehicle tire 12, such as the tire 12 shown in FIGS. 3 and 5. For example, the lift 10 may be used when changing the tire 12 of a light-duty, medium duty, or heavy-duty truck, or any other suitable motor vehicle utilized in automotive, agricultural, rail equipment, or heavy machinery applications. The lift 10 includes a plurality of casters 14 that movably support a support frame 16 of the lift 10 relative to a surface 18 on which the lift 10 rests, as shown in FIG. 1. The lift 10, therefore, is illustratively a portable device.

Figure 2:
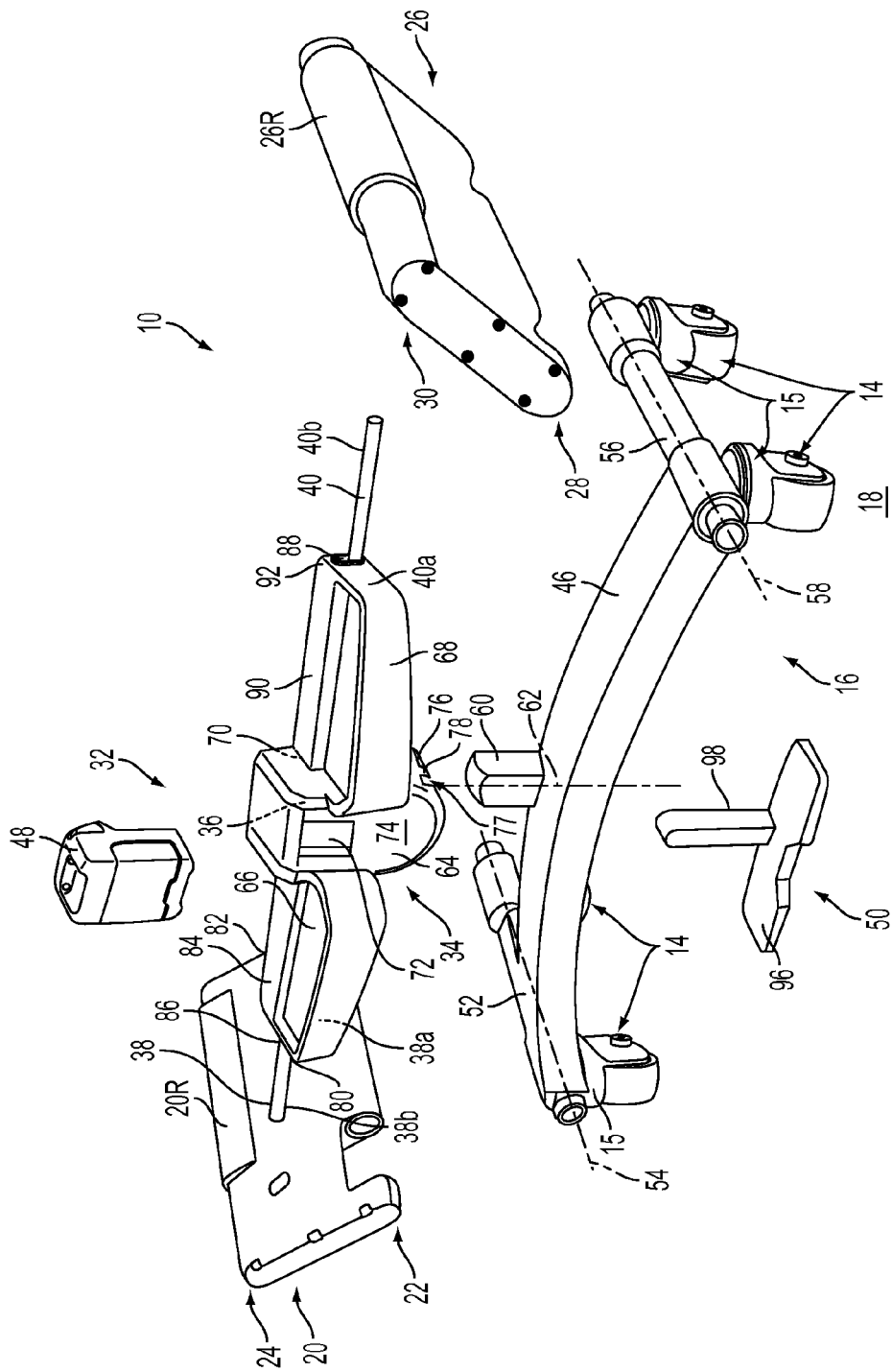
FIG. 2 is an exploded perspective view of various components of the cordless wheel lift of FIG. 1.

The lift 10 illustratively includes the support frame 16 and a pair of lift arms 20, 26 that are pivotally coupled to the support frame 16, as shown in FIGS. 1-2. Specifically, ends 22, 28 of the lift arms 20, 26 are pivotally coupled to the support frame 16. Ends 24, 30 of the lift arms 20, 26 are spaced from the support frame 16 opposite the ends 22, 28. As discussed in greater detail below, the ends 24, 30 of the lift arms 20, 26 are configured to engage a motor vehicle tire 12 so that the tire 12 is cooperatively supported by the lift arms 20, 26.

Figure 4:
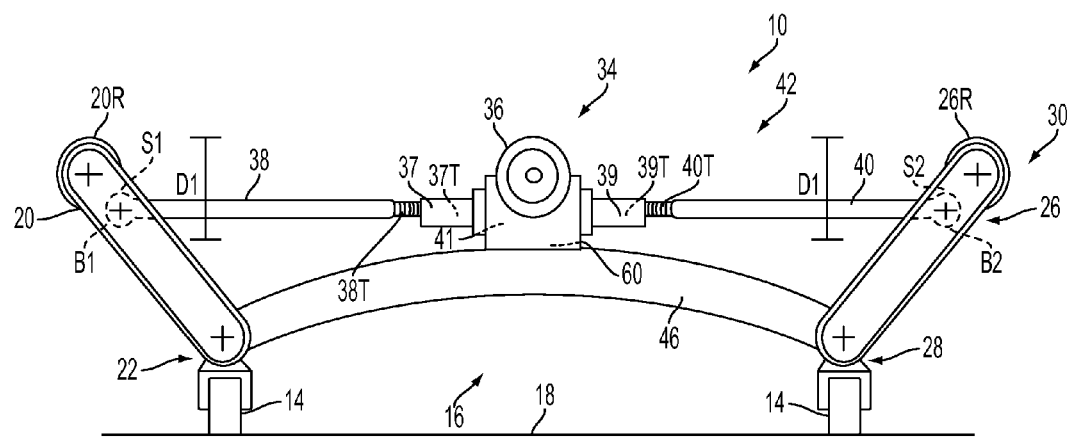
FIG. 4 is front elevation view of the cordless wheel lift of FIG. 1 (in which a housing of the cordless wheel lift has been removed for clarity), showing the pair of lift arms in the lowered position.

The lift 10 includes a housing 32 and powertrain 34 that are each supported by the support frame 16. The powertrain 34 of the lift 10 illustratively includes, among other components, a motor 36 and a pair of pull rods 38, 40. The pull rod 38 extends between the motor 36 and the lift arm 20, and the pull rod 40 extends between the motor 36 and the lift arm 26, as shown in FIG. 4. In use of the lift 10, the powertrain 34 is illustratively movable relative to the support frame 16. Specifically, the motor 36 of the powertrain 34 is movable relative to the support frame 16 in a vertical direction, as suggested by arrow 32A in FIG. 6, but is restrained from movement relative to the support frame 16 in horizontal directions. The pull rods 38, 40 of the drive train are movable relative to the support frame 16 in the same vertical direction, as well as along the horizontal direction that is parallel to the lengths of the pull rods 38, 40, but are restrained from movement along a perpendicular horizontal direction.

In use of the lift 10, the powertrain 34 moves the lift arms 20, 26 between lowered and raised positions 42, 44 in which the ends 24, 30 are spaced different distances above the support frame 16, thereby moving the tire 12 supported by the lift arms 20, 26 as the lift arms 20, 26 move between the positions 42, 44. Because rotational power generated by the powertrain 34 originates from the motor 36, the motor 36 may be said to move the lift arms 20, 26 between the positions 42, 44. In the lowered position 42 of the lift arms 20, 26, shown in FIG. 4, the ends 24, 30 of the lift arms 20, 26 are each positioned a distance D1 above an arced bridge 46 of the support frame 16. In the raised position 44 of the lift arms 20, 26, shown in FIG. 6, the ends 24, 30 of the lift arms 20, 26 are each positioned a distance D2 above the arced bridge 46 of the support frame 16. As will be appreciated from FIGS. 3-6, the distance D2 is illustratively greater than the distance D1 so that the tire 12 supported by the lift arms 20, 26 is alternately raised and lowered as the lift arms 20, 26 move between the positions 42, 44.

Returning to FIG. 1, the housing 32 is configured to receive a power source 48 so that power supplied by the power source 48 is delivered to the motor 36 supported by the housing 32. The power source 48 is illustratively embodied as a cordless power tool battery (i.e., a battery usable with a plurality of different power tools), and the motor 36 is illustratively embodied as an electric motor. However, it is contemplated that in other embodiments, other types of cordless, or corded, power sources may be utilized. For example, the power source 48 may be a compressed air source, and the motor 36 may be a pneumatic motor. As another alternative example, the power source 48 may be a hydraulic fluid source, and the motor 36 may be a hydraulic actuator.

To control operation of the powertrain 34, and thereby to move the lift arms 20, 26 between the positions 42, 44 as discussed above, the lift 10 includes a switch 50, as shown in FIG. 1. The switch 50 is illustratively coupled to the housing 32. As discussed in greater detail below, the switch 50 is configured to cause a rotor shaft of the motor 36 to rotate to move the lift arms 20, 26 between the lowered and raised positions 42, 44.

Referring now to FIG. 2, an exploded view of the lift 10 is shown. The support frame 16, the housing 32, the switch 50, and the lift arms 20, 26 are described in greater detail below primarily with reference to FIG. 2. The pull rods 38, 40 are described in greater detail below primarily with reference to FIGS. 2 and 4. The powertrain 34, as well as the movement of the lift arms 20, 26 between the positions 42, 44 in response to operation of the powertrain 34, will be described in greater detail below primarily with reference to FIGS. 3-6.

The support frame 16 of the lift 10 illustratively includes a pivot tube 52, a pivot tube 56, and the arced bridge 46, as best seen in FIG. 2. The pivot tube 52 extends along an axis 54, the pivot tube 56 extends along an axis 58 that is parallel to the axis 54, and the arced bridge 46 interconnects with and extends between the pivot tubes 52, 56. Two of the plurality of casters 14 are coupled to the pivot tube 52, while two of the plurality of casters 14 are coupled to the pivot tube 56. The pivot tubes 52, 56 are illustratively constructed of steel, and the arced bridge 46 is illustratively constructed of aluminum. Each of the casters 14 includes a housing 15 that is illustratively constructed of aluminum.

The pivot tube 52 is sized to be received by the end 22 of the lift arm 20 to pivotally couple the lift arm 20 to the support frame 16, and the pivot tube 56 is sized to be received by the end 28 of the lift arm 26 to pivotally couple the lift arm 26 to the support frame 16, as shown in FIG. 2. When the lift arms 20, 26 are coupled to the support frame 16, the lift arms 20, 26 are illustratively pivotal about the axes 54, 58 to move between the lowered and raised positions 42, 44.

The support frame 16 further includes a pedestal 60 that is interconnected with the arced bridge 46 and extends above the arced bridge 46 relative to the surface 18, as shown in FIG. 2. The pedestal 60 is illustratively sized to be received by the powertrain 34 to permit the powertrain 34 to move relative to the support frame 16 in the vertical direction. The pedestal 60 also restrains portions of the powertrain 34 from moving relative to the support frame 16 in one or more horizontal directions, as discussed above. The pedestal 60 extends in the vertical direction to define an axis 62, and the pedestal 60 is shaped to constrain the powertrain 34 against rotation about the axis 62 when the pedestal 60 is received by the powertrain 34. For instance, the pedestal 60 illustratively has a rectangular cross-sectional shape. It is contemplated that in other embodiments, the pedestal 60 may have other suitable cross-sectional shapes, such as triangular, hexagonal, or octagonal cross-sectional shapes, by way of example.

With regard to the housing 32, the housing 32 is supported by the support frame 16 as indicated above. The housing 32 illustratively includes a central body 64 and housing arms 66, 68 that are coupled to the central body 64 and that extend outwardly therefrom in opposite directions, as shown in FIG. 2. In the illustrative embodiment, the central body 64 and the housing arms 66, 68 are integrally formed such that the housing 32 has a unitary construction. As shown by the assembled lift 10 of FIG. 1, the housing arm 66 extends from the central body 64 toward the lift arm 20, and the housing arm 68 extends from the central body 64 toward the lift arm 26.

The central body 64 of the housing 32 defines an interior space 70 in which the motor 36 of the drivetrain 34 is positioned, as suggested by FIGS. 1 and 2. The central body 64 illustratively includes a cutout 72 that is formed in a planar exterior surface 74 thereof, a cutout 76 that extends through a curved exterior surface 78 thereof to open into the interior space 70, and a slot 77 that extends through the curved exterior surface 78 to open into the interior space 70. The cutout 72 is sized to receive the power source 48, the cutout 76 is sized to receive the pedestal 60, and the slot 77 is sized to receive the switch 50, as shown in FIG. 2.

The housing arm 66 of the housing 32 is formed to include a bore 80 that extends therethrough to open into the interior space 70, as suggested in FIGS. 1 and 2. The housing arm 66 is also formed to include a channel 82 that extends substantially over the length of the housing arm 66 toward an end 86 thereof to define a storage tray 84. The housing arm 68 of the housing 32 is formed to include a bore 88 that extends therethrough to open into the interior space 70, as suggested in FIGS. 1 and 2. The housing arm 68 is also formed to include a channel 90 that extends substantially over the length of the housing arm 68 toward an end 92 thereof to define a storage tray 94. The ends 86, 92 of the housing arms 66, 68 provide the opposite ends of the housing 32.

With regard to the switch 50, the switch 50 is coupled to the central body 64 of the housing 32 as shown in FIG. 2. The switch 50 illustratively includes a pedal 96 and a projection 98 coupled to the pedal 96 that extends upwardly therefrom in the vertical direction. The pedal 96 and the projection 98 are illustratively constructed of aluminum. The projection 98 is sized to be received in the slot 77 of the central body 64 to couple the switch 50 to the central body 64. In the assembled lift 10 of FIG. 1, the pedal 96 is positioned beneath the central body 64 when the projection 98 is received in the slot 77. It is contemplated that in other embodiments, the switch 50 may be embodied as, or otherwise include, a button, a knob, or any other type of interface suitable for user control of the powertrain 34.

In the illustrative embodiment, the pull rods 38, 40 of the lift 10 each extend between the central body 64 and one of the lift arms 20, 26 so that portions 38a, 40a of the pull rods 38, 40 are covered by the housing 32 and portions 38b, 40b of the pull rods 38, 40 extend outside of the housing 32. The portion 38a of the pull rod 38 is covered by the housing arm 66, and the portion 38b of the pull rod 38 extends outside of the housing arm 66 to couple to the lift arm 20, as suggested by FIG. 2. The portion 40a of the pull rod 40 is covered by the housing arm 68, and the portion 40b of the pull rod 40 extends outside of the housing arm 68 to couple to the lift arm 26, as suggested by FIG. 2. As best seen in FIGS. 3-6, the pull rods 38, 40 are pivotally coupled to the lift arms 20, 26. For example, each of the pull rods 38, 40 may be hinged to one of the lift arms 20, 26 such that the pull rods 38, 40 are pivotal relative to the lift arms 20, 26 only about axes extending parallel to the axes 54, 58. To illustrate these pivotal connections, hinges B1, B2 are designated at the interface of the pull rods 38, 40 and the lift arms 20, 26 in FIGS. 4 and 6.

Each of the pull rods 38, 40 extends through one of the bores 80, 88 of the housing arms 66, 68 toward the interior space 70, as suggested by FIG. 2. The portion 38a of the pull rod 38 extends through the bore 80 of the housing arm 66 toward the interior space 70. The portion 40a of the pull rod 40 extends through the bore 88 of the housing arm 68 toward the interior space 70.

The lift arms 20, 26 may illustratively be constructed of aluminum. As discussed above, the ends 24, 30 of the lift arms 20, 26 are configured to engage a motor vehicle tire 12 so that the tire 12 is cooperatively supported by the lift arms 20, 26 when the lift arms 20, 26 move between the positions 42, 44. To permit the tire 12 to rotate relative to each of the lift arms 20, 26 during this engagement, the lift arms 20, 26 include rollers 20R, 26R that are arranged at the ends 24, 30, as shown in FIG. 2. In use of the lift 10, the rollers 20R, 26R illustratively contact the tire 12 when the ends 24, 30 of the lift arms 20, 26 are engaged with the tire 12.

Figure 3:
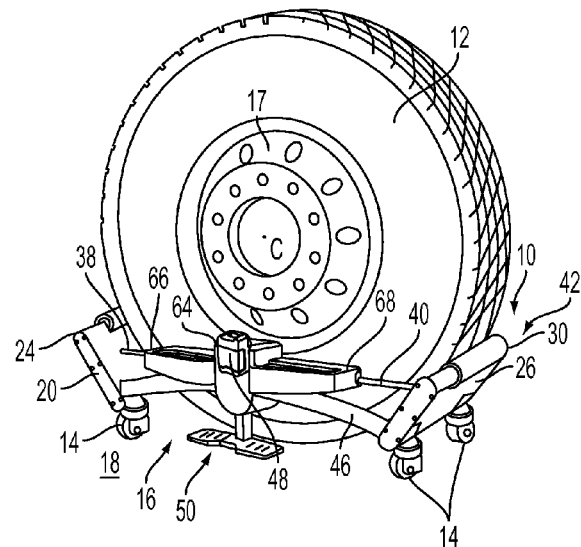
FIG. 3 is a perspective view of the cordless wheel lift of FIG. 1, showing a pair of lift arms of the cordless wheel lift engaged with a motor vehicle tire while in a lowered position.

Referring now to FIG. 3, the ends 24, 30 of the lift arms 20, 26 are engaged with the tire 12 in the lowered position 42 in which the ends 24, 30 are positioned the distance D1 above the arced bridge 46 of the support frame 16, as discussed above. In the illustrative lowered position 42 of the lift arms 20, 26, a center C about which the tire 12 extends circumferentially lies below a center of a hub of the motor vehicle (not shown) that is configured to couple to a wheel 17 coupled to the tire 12. Thus, in the lowered position 42 of the lift arms 20, 26, the tire 12 has yet to be raised toward the center of the hub of the motor vehicle.

Figure 6:
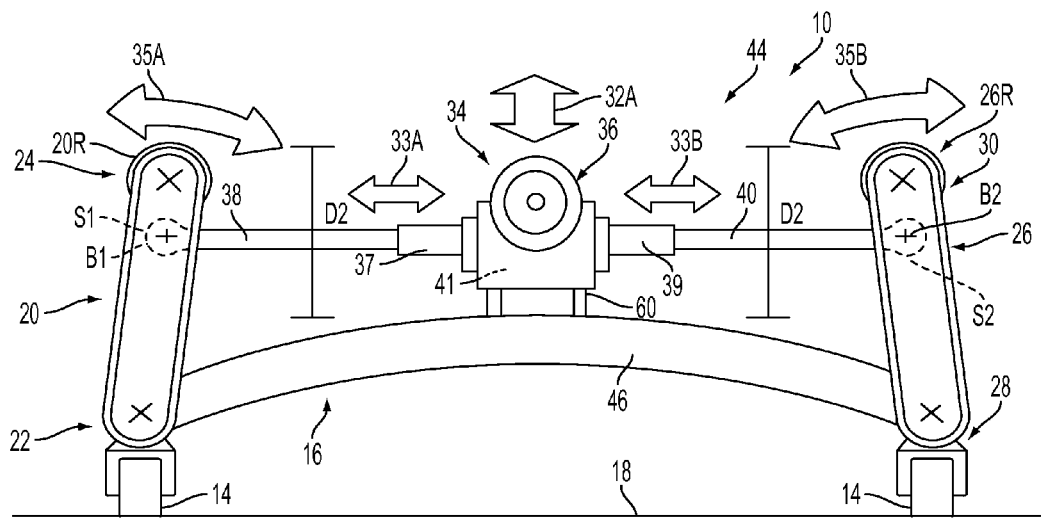
FIG. 6 is front elevation view of the cordless wheel lift of FIG. 1 (in which the housing has been removed for clarity), showing the pair of lift arms in the raised position.

Referring now to FIG. 4, the ends 24, 30 of the lift arms 20, 26 are shown (without the tire 12) in the lowered position 42. In the illustrative lowered position 42 of the lift arms 20, 26, the motor 36 is adjacent the arced bridge 46 of the support frame 16, as shown in FIG. 4. In the illustrative raised position 44 of the lift arms 20, 26, the motor 36 is spaced apart from the arced bridge 46, as shown in FIG. 6. As discussed in greater detail below, operation of the powertrain 34 moves the pull rods 38, 40 relative to the motor 36 to cause the lift arms 20, 26 to move between the positions 42, 44, thereby moving the powertrain 34 in the vertical direction along the axis 62 in the process.

The motor 36 includes the rotor shaft, as discussed above, and the powertrain 34 illustratively includes output shafts 37, 39 and a gear reduction mechanism 41 coupled between the rotor shaft and the output shafts 37, 39 as suggested by FIG. 4. The motor 36 is operable to generate rotational power at the rotor shaft at a higher speed, and the gear reduction mechanism 41 is operable to transmit rotational power from the rotor shaft to the output shafts 37, 39 at a lower speed (relative to the higher speed of the rotor shaft). The motor 36, the gear reduction mechanism 41, and the output shafts 37, 39 of the powertrain 34 may be embodied as a dual-output-shaft gearmotor in some embodiments. In other embodiments, rather than being provided as a single unit (e.g., in the case of a gearmotor), the powertrain 34 may be formed from an assembly of separate components. In either case, friction between components of the illustrative powertrain 34 such as, for example, the gear reduction mechanism 41, may be sufficient to prevent typical loads (e.g., the load exerted on the lift 10 by the tire 12) from causing the powertrain 34 to be driven from rest in an undesired direction. The powertrain 34 may thereby provide an integral braking system for the lift 10.

Each of the output shafts 37, 39 illustratively includes internal threads 37T, 39T as suggested by FIG. 4. The internal threads 37T, 39T are engaged with external threads 38T, 40T of the pull rods 38, 40. When the motor 36 is operated in use of the lift 10, rotational power generated by the motor 36 is transmitted to the output shafts 37, 39 via the gear reduction mechanism 41, thereby causing the pull rods 38, 40 to move inwardly and outwardly relative to the output shafts 37, 39. Because the pull rods 38, 40 are coupled to the lift arms 20, 26, inward and outward movement of the pull rods 38, 40 causes the lift arms 20, 26 to move between the positions 42, 44, as shown in FIGS. 4 and 6.

Figure 5:
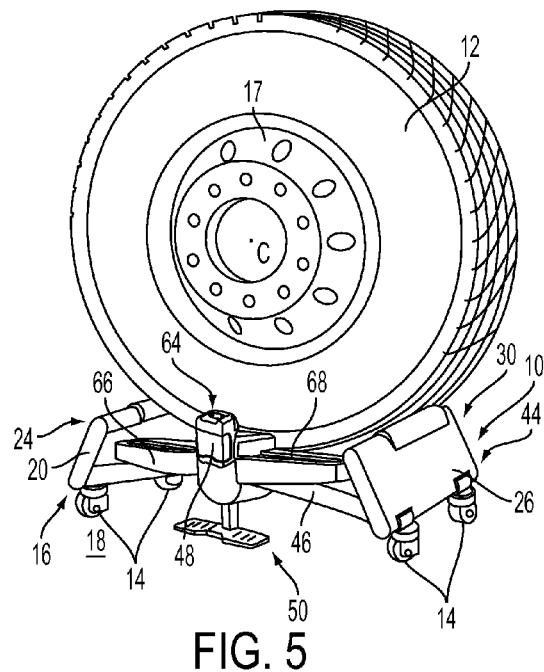
FIG. 5 is a perspective view of the cordless wheel lift of FIG. 1, showing the pair of lift arms engaged with the motor vehicle tire while in a raised position.

Referring now to FIG. 5, the ends 24, 30 of the lift arms 20, 26 are engaged with the tire 12 in the raised position 44 in which the ends 24, 30 are positioned the distance D2 above the arced bridge 46 of the support frame 16. In the illustrative raised position 44 of the lift arms 20, 26, the center C about which the tire 12 extends circumferentially is substantially aligned with the center of the hub of the motor vehicle that is configured to couple to the wheel 17 so that the center C and the center of the hub are substantially equidistant from the surface 18. Thus, in the raised position 44 of the lift arms 20, 26, the tire 12 has been raised to the center of the hub of the motor vehicle.

Referring now to FIG. 6, movement of the powertrain 34 along the vertical direction is illustrated. Operation of the motor 36 causes the pull rods 38, 40 to move inwardly and outwardly along the horizontal direction suggested by arrows 33A, 33B relative to the output shafts 37, 39 and the housing 32. As the pull rods 38, 40 move in the horizontal directions, the lift arms 20, 26 rotate about the support frame 16 as indicated by the arrows 35A, 35B between the positions 42, 44. The powertrain 34 moves in the vertical direction indicated by the arrow 32A when the lift arms 20, 26 move between the positions 42, 44.

Referring again to FIGS. 1-6, operation of the lift 10 during removal of a tire 12 to be changed will now be described. Initially, the ends 24, 30 of the lift arms 20, 26 are engaged with the tire 12 to be changed in the raised position 44 so that the lift arms 20, 26 cooperatively support the tire 12 to be changed above the surface 18 on which the lift 10 rests. After moving the lift 10 (and the tire 12, now supported by the lift 10) away from the motor vehicle (via the casters 14), the user applies pressure to the pedal 96 of the switch 50 to cause the rotor shaft of the motor 36 to rotate. Rotation of the rotor shaft is transmitted to the output shafts 37, 39 via the gear reduction mechanism 41. The threaded engagement between the output shafts 37, 39 and the pull rods 38, 40 causes the pull rods 38, 40 to move outward relative to the output shafts 37, 39 in the horizontal directions in response to rotation of the output shafts 37, 39. As the pull rods 38, 40 move in the horizontal directions, the lift arms 20, 26 rotate about the axes 54, 58 toward the lowered position 42. Specifically, the lift arm 20 rotates counterclockwise about the axis 54 toward the lowered position 42, and the lift arm 26 rotates clockwise about the axis 58 toward the lowered position 42. When the lift arms 20, 26 move toward the lowered position 42, the powertrain 34 moves downwardly in the vertical direction along the pedestal 60. Once the lift arms 20, 26 have been lowered to the lowered position 42, the user may remove pressure from the pedal 96 of the switch 50 cause the rotor shaft to cease rotation. At that point, the ends 24, 30 of the lift arms 20, 26 are engaged with the tire 12 to be changed in the lowered position 42. The tire 12 to be changed may then be removed from the lift 10 in preparation for installing a new tire 12.

Referring now to FIGS. 1-6, operation of the lift 10 during installation of a tire 12 will now be described. Initially, the ends 24, 30 of the lift arms 20, 26 are engaged with the tire 12 in the lowered position 42 so that the tire 12 is cooperatively supported by the lift arms 20, 26 above the surface 18. A user applies pressure to the pedal 96 of the switch 50 to cause the rotor shaft of the motor 36 to rotate. Rotation of the rotor shaft is transmitted to the output shafts 37, 39 via the gear reduction mechanism 41. The threaded engagement between the output shafts 37, 39 and the pull rods 38, 40 causes the pull rods 38, 40 to move inward relative to the output shafts 37, 39 in the horizontal directions in response to rotation of the output shafts 37, 39. As the pull rods 38, 40 move in the horizontal directions, the lift arms 20, 26 rotate about the axes 54, 58 toward the raised position 44. Specifically, the lift arm 20 rotates clockwise about the axis 54 toward the raised position 44, and the lift arm 26 rotates counterclockwise about the axis 58 toward the raised position 44. When the lift arms 20, 26 move toward the raised position 44, the powertrain 34 moves upwardly in the vertical direction along the pedestal 60. Once the lift arms 20, 26 have been raised to the raised position 44, the user may remove pressure from the pedal 96 of the switch 50 cause the rotor shaft to cease rotation. At that point, the ends 24, 30 of the lift arms 20, 26 are engaged with the tire 12 in the raised position 44. The lift 10 may then be moved (on casters 14) to engage the wheel 17 coupled to the tire 12 with the hub of the motor vehicle.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A lift comprising:
a support frame;
a pair of lift arms, each of the lift arms including a first end pivotally coupled to the support frame and a second end opposite the first end, the second ends of the pair of lift arms being configured to engage a motor vehicle tire such that the pair of lift arms cooperatively support the tire; and
a powertrain including a motor and a pair of pull rods, each of the pull rods being coupled between the motor and one of the pair of lift arms, a means for relative movement of the motor with the support frame in a vertical direction and restrained from movement relative to the support frame in horizontal directions;
wherein the powertrain is operable to move the pair of lift arms between a first position, in which the second end of each of the lift arms is positioned a first distance above the support frame, and a second position, in which the second end of each of the lift arms is positioned a second distance above the support frame, the second distance being greater than the first distance.

2. The lift of claim 1, wherein the powertrain further comprises a pair of output shafts, each of the pair of output shafts being coupled between the motor and one of the pair of pull rods.

3. The lift of claim 2, wherein:
the motor includes a rotor shaft; and
the powertrain further includes a gear reduction mechanism coupled between the rotor shaft and the pair of output shafts.

4. The lift of claim 3, wherein the gear reduction mechanism is configured to prevent undesired movement of the pair of lift arms when the motor vehicle tire is supported on the pair of lift arms.

5. The lift of claim 2, wherein:
each of the pair of pull rods includes external threads;
each of the pair of output shafts includes internal threads that engage the external threads of one of the pair of pull rods; and
the pair of output shafts are configured to transmit rotational power from the motor to the pair of pull rods to cause the pair of pull rods to move inwardly and outwardly relative to the pair of output shafts to move the pair of lift arms between the first and second positions.

6. The lift of claim 1, further comprising a housing supported by the support frame, wherein the motor is positioned within the housing, a first portion of each of the pull rods is covered by the housing, and a second portion of each of the pull rods extends outside of the housing between the housing and one of the pair of lift arms.

7. The lift of claim 6, wherein the housing is formed to include a cutout sized to receive a power source, the power source being configured to supply power to the motor when the power source is received in the cutout.

8. The lift of claim 7, wherein the power source comprises a cordless power tool battery.

9. The lift of claim 7, wherein:
the housing is formed to include a pair of storage trays; and
the cutout sized to receive the power source is positioned between the pair of storage trays.

10. The lift of claim 6, further comprising a switch coupled to the housing, the switch being configured to control operation of the motor.

11. The lift of claim 10, wherein the switch comprises a pedal positioned beneath the housing.

12. A lift comprising:
a support frame including a pedestal;
a pair of lift arms, each of the lift arms including a first end pivotally coupled to the support frame and a second end opposite the first end, the second ends of the pair of lift arms being configured to engage a motor vehicle tire such that the pair of lift arms cooperatively support the tire;
a powertrain supported on the pedestal and operable to move the pair of lift arms between a first position, in which the second end of each of the lift arms is positioned a first distance above the support frame, and a second position, in which the second end of each of the lift arms is positioned a second distance above the support frame, the second distance being greater than the first distance; and
a means for relative movement of the powertrain to the pedestal in a vertical direction when the pair of lift arms moves between the first and second positions.

13. The lift of claim 12, wherein the pedestal extends in the vertical direction to define an axis and is shaped to constrain the powertrain against rotation about the axis.

14. The lift of claim 12, wherein the powertrain is restrained from movement relative to the pedestal in a first horizontal direction when the pair of lift arms move between the first and second positions.

15. The lift of claim 14, wherein the powertrain comprises a pair of pull rods, each of the pull rods being coupled to one of the pair of lift arms such that movement of the pair of pull rods relative to the housing along a second horizontal direction causes the pair of lift arms to move between the first and second positions, the second horizontal direction being perpendicular to the first horizontal direction.

16. The lift of claim 12, further comprising a housing supported on the support frame, the housing including a central body and a pair of housing arms coupled to the central body and extending outwardly therefrom in opposite directions.

17. The lift of claim 16, wherein:
the central body defines an interior space;
each of the housing arms is formed to include a bore extending therethrough to open into the interior space; and
the powertrain comprises a pair of pull rods, each of the pull rods being coupled to one of the pair of lift arms and extending through one of the bores formed in the housing arms.

18. The lift of claim 16, wherein:
each housing arm is formed to include a channel that defines a storage tray; and
the central body is formed to include a cutout sized to receive a cordless power tool battery.

19. The lift of claim 16, further comprising a switch coupled to the central body, the switch being configured to control operation of the powertrain.

20. The lift of claim 19, wherein the switch comprises a pedal positioned beneath the central body.

* * * * *